US012804385B2

(12) United States Patent
Thomas et al.

(10) Patent No.: US 12,804,385 B2
(45) Date of Patent: Nov. 17, 2026

(54) AUTONOMOUS IDENTIFICATION OF ROUGE DEVICES IN A COMMUNICATIONS NETWORK

(71) Applicant: International Business Machines Corporation, Armonk, NY (US)

(72) Inventors: Mathews Thomas, Flower Mound, TX (US); Sagar Tayal, Ambala City (IN); Utpal Mangla, Toronto (CA); Dinesh C. Verma, New Castle, NY (US); Saurabh Agrawal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 17/933,891

(22) Filed: Sep. 21, 2022

(65) Prior Publication Data

US 2024/0098486 A1 Mar. 21, 2024

(51) Int. Cl.
*H04W 12/02* (2009.01)
*H04W 12/08* (2021.01)

(52) U.S. Cl.
CPC ........... *H04W 12/02* (2013.01); *H04W 12/08* (2013.01)

(58) Field of Classification Search
CPC ..................................................... H04W 12/02
See application file for complete search history.

(56) References Cited

U.S. PATENT DOCUMENTS

2007/0287433 A1 12/2007 Wollersheim et al.
2014/0004892 A1* 1/2014 Murynets ................ H04W 4/14 455/466
2021/0306235 A1 9/2021 Al-Dulaimi et al.
(Continued)

FOREIGN PATENT DOCUMENTS

WO 2021049783 A1 3/2021

OTHER PUBLICATIONS

Cattoni et al., "An end-to-end testing ecosystem for 5G." ieeexplore, 2016, 3 Pages.

(Continued)

*Primary Examiner* — Simon P Kanaan
(74) *Attorney, Agent, or Firm* — CANTOR COLBURN LLP; Tihon Poltavets

(57) ABSTRACT

Computer-implemented methods for autonomous identification of rouge devices in a communications network are provided. Aspects include collecting connection trace data including connection characteristics for each of a plurality of mobile devices in communication with a communications network and aggregating the connection trace data. Aspects also include determining performance characteristics for each of a plurality of groups of the plurality of mobile devices, wherein each of the plurality of groups corresponds to mobile devices having a type approval code and comparing the performance characteristics for each of the plurality of groups. Based on a determination that the performance characteristics of one of the plurality of groups deviate from the performance characteristics of a remaining set of the plurality of groups by more than a first threshold amount, aspects include designating the type approval code associated with the one of the plurality of groups as a rogue type approval code.

17 Claims, 7 Drawing Sheets

(56) References Cited

U.S. PATENT DOCUMENTS

2021/0400537 A1 * 12/2021 Zhang .................... H04L 47/30

OTHER PUBLICATIONS

Hussain."Artificial Intelligence-Based Anomaly Detection For The Efficient Management And Security Of The Future Cellular Networks." Polyu Electronic Theses. May 2021. 200 Pages.

Hussein et al., "Intensive Benchmarking of D2D communication over 5G cellular networks: prototype, integrated features, challenges, and main applications." springer.com, Sep. 2019, 21 Pages.

Park et al., "DoLTEst: In-depth Downlink Negative Testing Framework for LTE Devices." Usenix.org, 2019, 18 Pages.

Symeonides et al., "5G-Slicer: An emulator for mobile IoT applications deployed over 5G network slices." 2022, 13 Pages.

Zayas et al., "An End-to-End Automation Framework for Mobile Network Testbeds." hindawi.com. Apr. 1, 2019. 12 Pages.

* cited by examiner

500

| TAC | Signaling response | location | Feature support | KPI | Signal strength | Radio attributes |
|---|---|---|---|---|---|---|
| 13212212 | RRC - 1 delay | ABC | support | Poor | Good | Poor |
| 58212212 | RRC-No delay | BDE | support | Good | Poor | Poor |
| 43212212 | RRC-No response | BAC | support | Poor | Good | Good |

FIG. 5

600

| Time Stamp | Networ k element | Randomized IMEI | TAC | Signaling response | locati on | Feature | KPI | Signal strength | Radio attributes |
|---|---|---|---|---|---|---|---|---|---|
| aa:bb.ccc | NE 1 | 13212212xxxxxxx | 13212212 | RRC - 1 delay | ABC | support | Poor | Good | Poor |
| zb.cb.ddd | NE 2 | 13212212xxxxxxx | 13212212 | RRC - 1 delay | DEB | support | Poor | Good | Good |
| aa:bb.ccv | NE 1 | 58212212xxxxxxx | 58212212 | RRC-No delay | BDE | support | Good | Poor | Poor |
| zb.cb.dbe | NE 3 | 58212212xxxxxxx | 58212212 | RRC-No delay | CAB | support | Good | Good | Poor |
| aa:bb.ctb | NE 1 | 43212212xxxxxxx | 43212212 | RRC-No response | BAC | support | Poor | Good | Good |
| zb.aa.daz | NE 2 | 13212212xxxxxxx | 13212212 | RRC - 1 delay | ZAK | support | Poor | Poor | Poor |
| bd:bb.ccc | NE 1 | 58212212xxxxxxx | 58212212 | RRC-No delay | VYE | support | Good | Good | Good |
| zb.cb.ddd | NE 2 | 13212212xxxxxxx | 13212212 | RRC - 1 delay | DKE | support | Poor | Poor | Good |

FIG. 6

AUTONOMOUS IDENTIFICATION OF ROUGE DEVICES IN A COMMUNICATIONS NETWORK

BACKGROUND

The present invention generally relates to communications networks, and more specifically, to computer systems, computer-implemented methods, and computer program products for autonomous identification of rouge devices in a communications network.

In recent years, the number of devices that utilize mobile communications networks has greatly increased and this trend is expected to continue. Currently, many network operators require new devices that wish to access their communications network to go through extensive compatibility testing, which often requires the use of specialized equipment, to ensure that the device will operate properly on the network. Once the testing is completed, the test results are submitted to the network operator, which adds a type approval code (TAC) associated with the device to a whitelist of mobile devices which are permitted to access the mobile network.

This manual process of testing device compatibility, reviewing the testing data, and adding the device to a whitelist of the mobile network is extremely time-consuming and inefficient.

SUMMARY

Embodiments of the present invention are directed to a method for autonomous identification of rouge devices in a communications network. According to an aspect, a computer-implemented method includes collecting connection trace data including connection characteristics for each of a plurality of mobile devices in communication with a communications network and aggregating the connection trace data. The method also includes determining performance characteristics for each of a plurality of groups of the plurality of mobile devices, wherein each of the plurality of groups corresponds to mobile devices having a type approval code and comparing the performance characteristics for each of the plurality of groups. Based on a determination that the performance characteristics of one of the plurality of groups deviate from the performance characteristics of a remaining set of the plurality of groups by more than a first threshold amount, the method also includes designating the type approval code associated with the one of the plurality of groups as a rogue type approval code.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 is a block diagram of a log of connection trace data for use in conjunction with one or more embodiments of the present invention;

FIG. 6 is a block diagram of an anonymized log of connection trace data for use in conjunction with one or more embodiments of the present invention;

DETAILED DESCRIPTION

Figure 1:
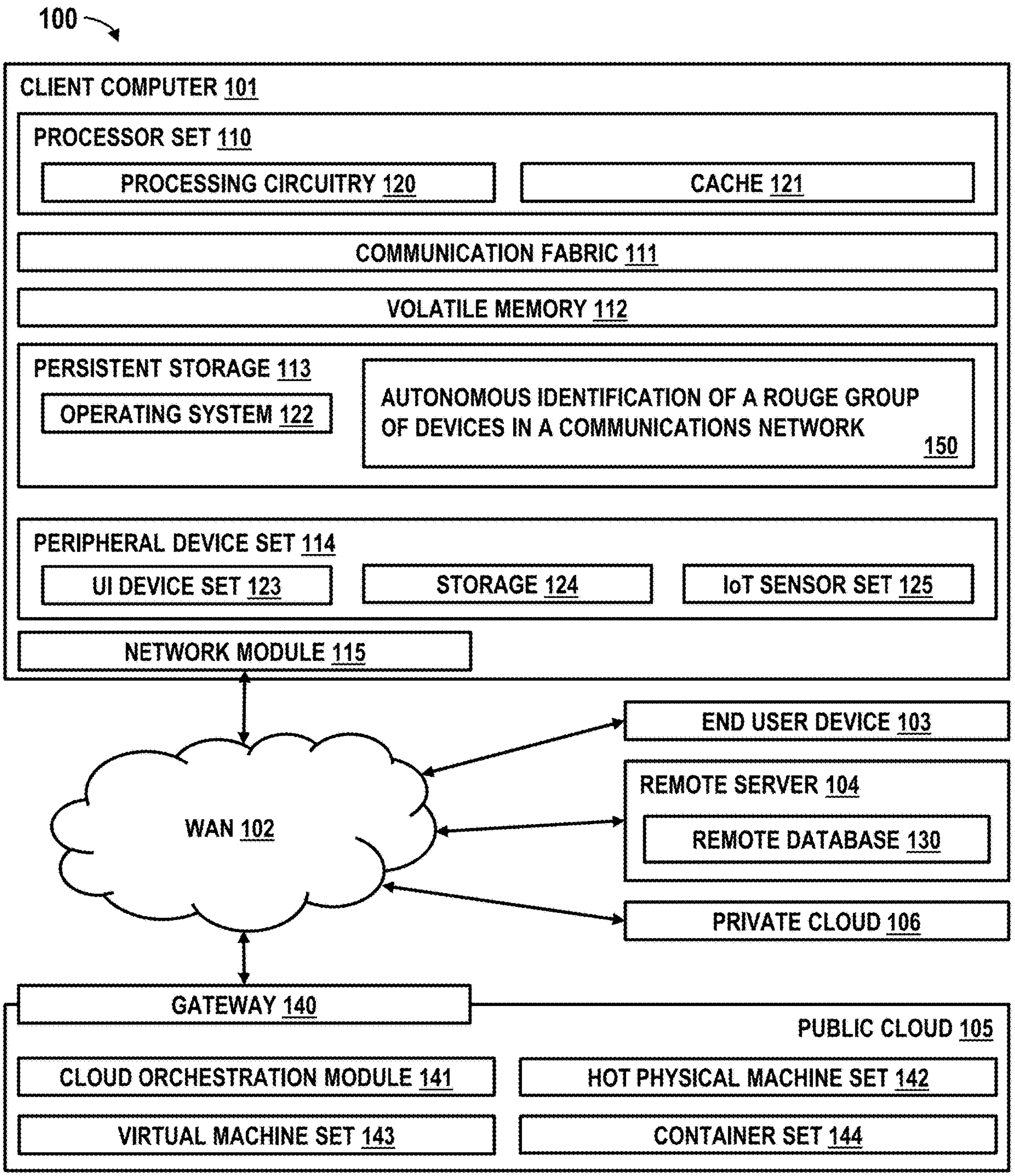
FIG. 1 depicts a block diagram of an example computer system for use in conjunction with one or more embodiments of the present invention.

As discussed above, the process of manually testing device compatibility, reviewing the testing data, and adding the device to a whitelist of the mobile network is extremely time-consuming and inefficient. Exemplary embodiments of the present invention overcome the shortcomings of this manual process by providing methods, systems, and computer program products for autonomous identification of rouge devices in a communications network.

In exemplary embodiments, newly developed mobile devices are no longer required to be extensively tested and onboarded into communications networks. Rather, new mobile devices are able to access communications networks without prior approval. The communications networks are configured to monitor the performance of the mobile devices accessing the communications network and to identify mobile devices, or groups of mobile devices, that is behaving in an abnormal manner. Once a mobile device, or group of mobile devices, is identified as behaving in an abnormal manner, the mobile device, or group of mobile devices, is labeled as a rogue device, or device type, which results in an action being taken by the network. The action can include blacklisting the mobile device, or group of mobile devices, or transmitting an anomaly report to a manufacturer of the mobile device to indicate the identified abnormal behavior.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the autonomous identification of a rouge group of devices in a communications network 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
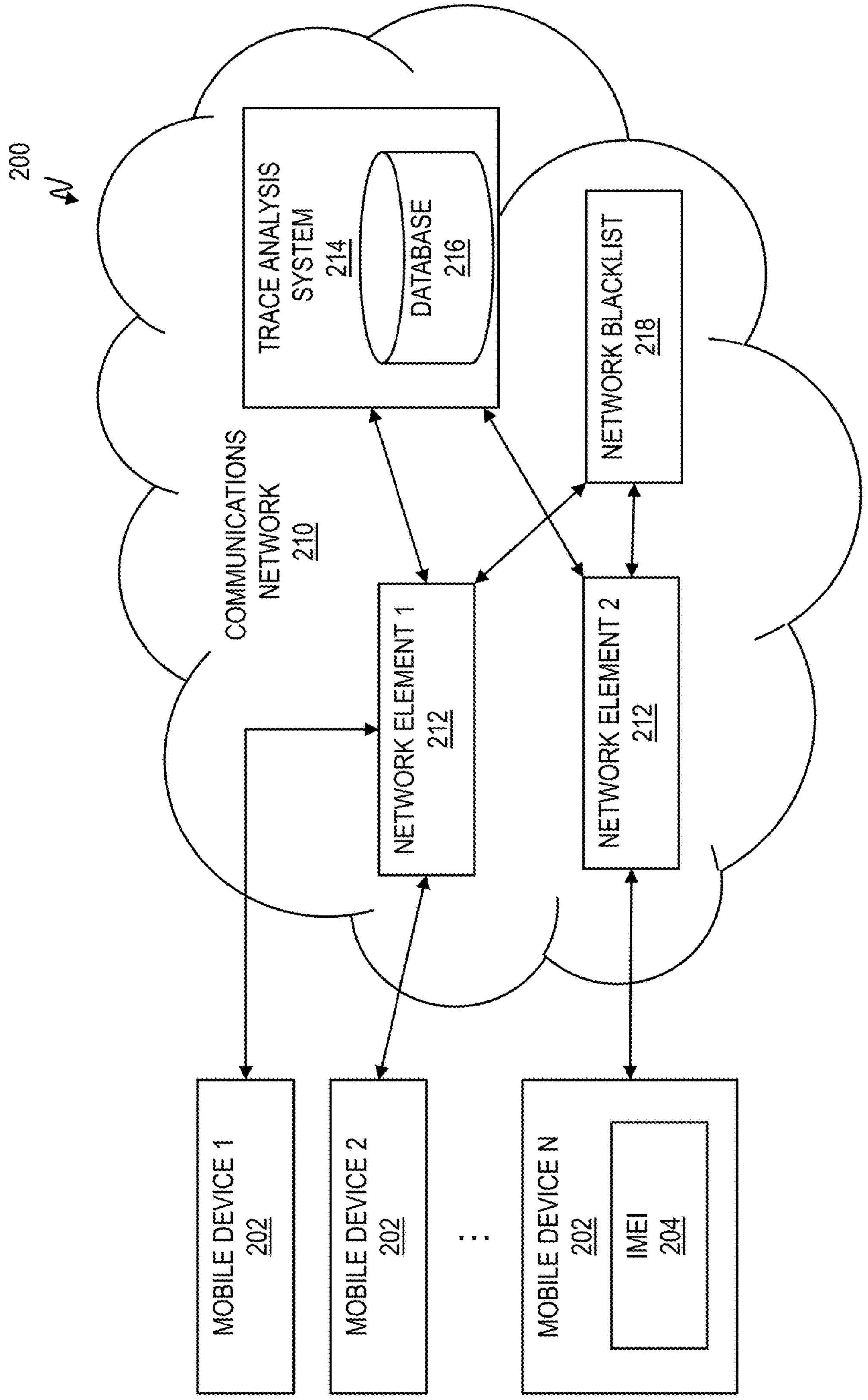
FIG. 2 is a block diagram of a system for use in conjunction with one or more embodiments of the present invention.

Referring now to FIG. 2, a block diagram of a system 200 for use in conjunction with one or more embodiments of the present invention is shown. In exemplary embodiments, the system 200 includes a plurality of mobile device 202 that each have an international mobile equipment identity (IMEI) number 204. In exemplary embodiments, the mobile device 202 can include, but are not limited to, cellular telephones, tablets, smartwatches, and any other internet-of-things (IoT) devices that are configured to access a communications network 210. In one embodiment, the communications network 210 is a cellular communications networks that include one or more network elements 212. The network elements 212 include one or more of GSM, WCDMA, LTE, 4G and 5G networks elements, such as a base station, a radio unit, a centralized unit, a distributed unit, a hotspot, Wi-Fi equipment, and the like.

In exemplary embodiments, the network elements 212 are configured to collect connection trace data for the connections between the network elements 212 and the mobile devices 202 that connect to the communications network 210 through the network elements 212. The communications network 210 also includes a trace analysis system 214 that is configured to aggregate and analyze the connection trace data for the mobile devices 202. In one embodiment, one or more of the network elements 212 and the trace analysis system 214 is configured to anonymize the connection trace data by modifying a serial number of an international mobile equipment identity (IMEI) number of the mobile device 202 corresponding to the connection trace data. The trace analysis system 214 includes a database 216 that is used to store connection trace data. In one embodiment, the trace analysis system 214 is embodied in a computer 101, as shown in FIG. 1.

In exemplary embodiments, the trace analysis system 214 is configured to divide the connection trace information into a plurality of groups, where each grouping corresponds to mobile devices 202 having a specific type approval code, which is part of the IMEI number 204. Once the connection trace information is divided into groups, the trace analysis system 214 calculates a plurality of performance characteristics for each group of mobile devices 202. The trace analysis system 214 compares the performance characteristics of the groups of mobile devices 202 to identify any groups of mobile devices 202 that have abnormal performance characteristics. If a group of mobile devices 202 is determined to have abnormal performance characteristics, the type approval code corresponding to the group of mobile devices 202 is flagged as a rogue device. In exemplary embodiments, once a group of mobile devices 202 is flagged as a rogue device, the type approval code for the group of mobile devices 202 is added to a network blacklist 218 of the communications network 210.

Figure 3:
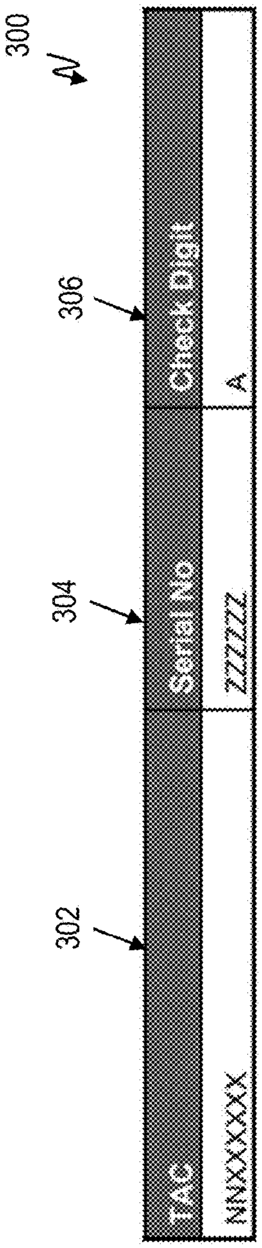
FIG. 3 is a block diagram of an international mobile equipment identity (IMEI) number for use in conjunction with one or more embodiments of the present invention.

Referring now to FIG. 3, a block diagram of an international mobile equipment identity (IMEI) number 300 for use in conjunction with one or more embodiments of the present invention. As illustrated, the IMEI 300 includes a type approval code (TAC) 302, a serial number 304, and a check digit 306. In exemplary embodiments, the TAC 302 is a code that is unique to a type of mobile device, i.e., all mobile devices of the same make and model have the same TAC 302. The serial number 304 is a unique identifier for each mobile device of a particular model and the check digit 306 is a digit configured to detect mistakes in reading or transcription of the IMEI 300.

Figure 4:
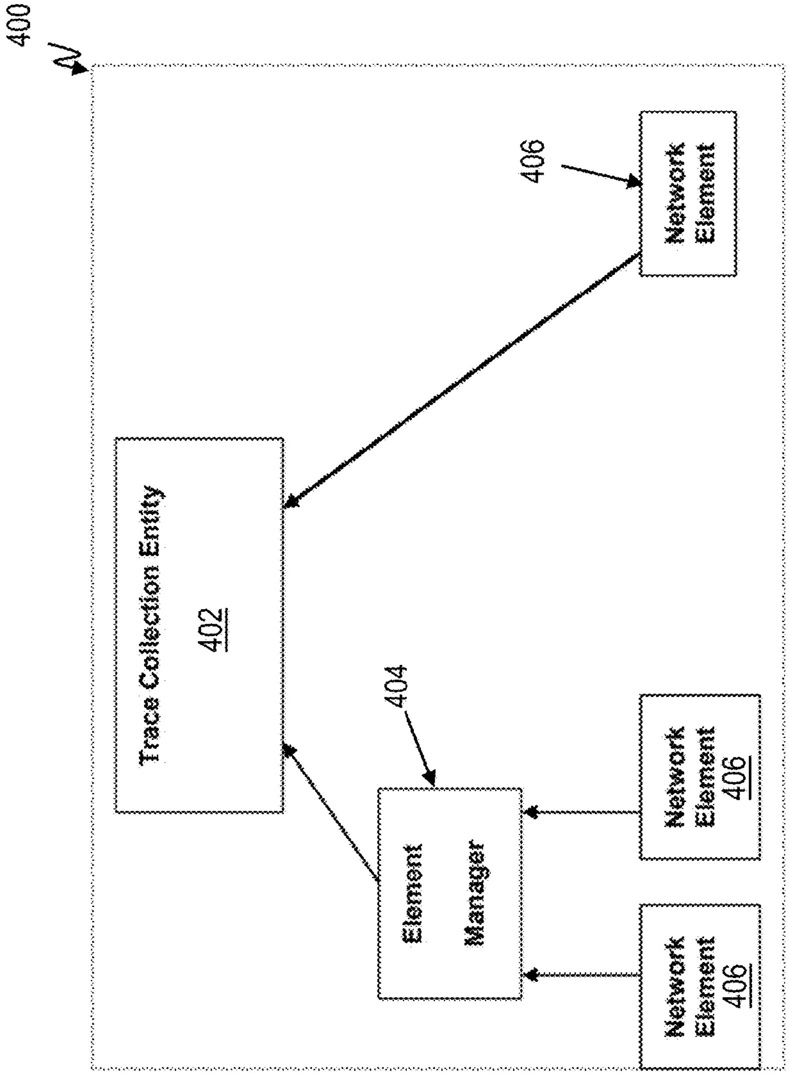
FIG. 4 is a block diagram of a system for use in conjunction with one or more embodiments of the present invention.

Referring now to FIG. 4, a block diagram of a system 400 for use in conjunction with one or more embodiments of the present invention. In exemplary embodiments, the system 400 includes a plurality of network elements 406, such as cellular towers or access points. The network elements 406 are configured to collect connection trace data for mobile device connected to the network elements. As illustrated, the network elements 406 may directly provide the collected connection trace data to a trace collection entity 402 or may provide the collected connection trace data to an element manager 404, such as an edge server. In one embodiment, the element manager 404 is configured to receive connection trace data from a plurality of network elements 406 and to anonymize and aggregate the connection trace data prior to providing it to the trace collection entity 402. In one embodiment, the trace collection entity 402 is configured to anonymize and aggregate the connection trace data received from the element manager 404 and network elements 406.

In exemplary embodiments, as shown in FIG. 5, the connection trace data includes a plurality of information regarding the connection between the mobile device and the communications network. For example, the connection trace data can include, but is not limited to, one or more of signaling response data, geolocation data, feature support data, key performance indicator (KPI) data, signal strength data, and radio attribute data.

In one embodiment, signaling response data includes information regarding a response pattern of the mobile device to signals sent from the communications network. For example, when a base station sends a radio resource control (RRC) reconfiguration request to a mobile device, the mobile device should reply with an RRC reconfiguration complete message as to adhere to the standards. In exemplary embodiments, the geolocation data can include information regarding the location of the mobile device during the connection with the communications network and/or the location of a network element communicating with the mobile device. For example, the geolocation data may include the GPS location of the mobile device.

In exemplary embodiments, the feature support data includes information regarding the features of the mobile device that have been observed as being supported by the communications network. In one embodiment, the network elements are configured to capture capability messages transmitted by the mobile device and to extract feature group indicators from the capability messages. In exemplary embodiments, mobile devices having the same chipset should support similar advanced features like MIMO, FDD-TDD handover so it should be uniform. In exemplary embodiments, as shown in FIG. 6, the KPI data includes collecting communications performance data such as throughput, latency, call setup success rate (CSSR), RRC signaling delay, and the like.

In exemplary embodiments, the signal strength data includes captured signal strength measurements for communication between the mobile device and the network element, and data regarding the quality of the connection between the mobile device and the network elements. In one embodiment, the signal strength data is obtained based on a measurement report sent from the mobile device to the network element. The radio attributes data includes information regarding a modulation scheme for communication between the mobile device and the network element, block error rates for communication between the mobile device and the network element, beam group analysis, physical resource block (PRB) utilization, handover rate, and the like.

FIG. 5 is a block diagram of log 500 of signaling response patterns that are captured by a network element. As shown the log includes TAC code, signaling response data, location data, feature support data, KPI data, signal strength data, and radio attributes. FIG. 6 is a block diagram of a log of anonymized connection trace data for use by a trace analysis system 214.

In exemplary embodiments, the network elements and/or element managers collect, aggregate, and anonymize collection trace data that is ultimately provided to the trace analysis system. The trace analysis system further aggregates the collection trace data on the basis of TAC codes to benchmark the performance against each other to identify performance issues with devices having a particular TAC code. Depending on the severity of the identified performance issues with devices having a particular TAC code, the trace analysis system may designate a TAC code as being a rogue group of devices. In exemplary embodiments, the trace analysis system is configured to determine average performance characteristics for each TAC code. These average performance characteristics are provided to network elements and/or element managers for real-time monitoring of active connections between mobile devices and the communications network.

Figure 7:
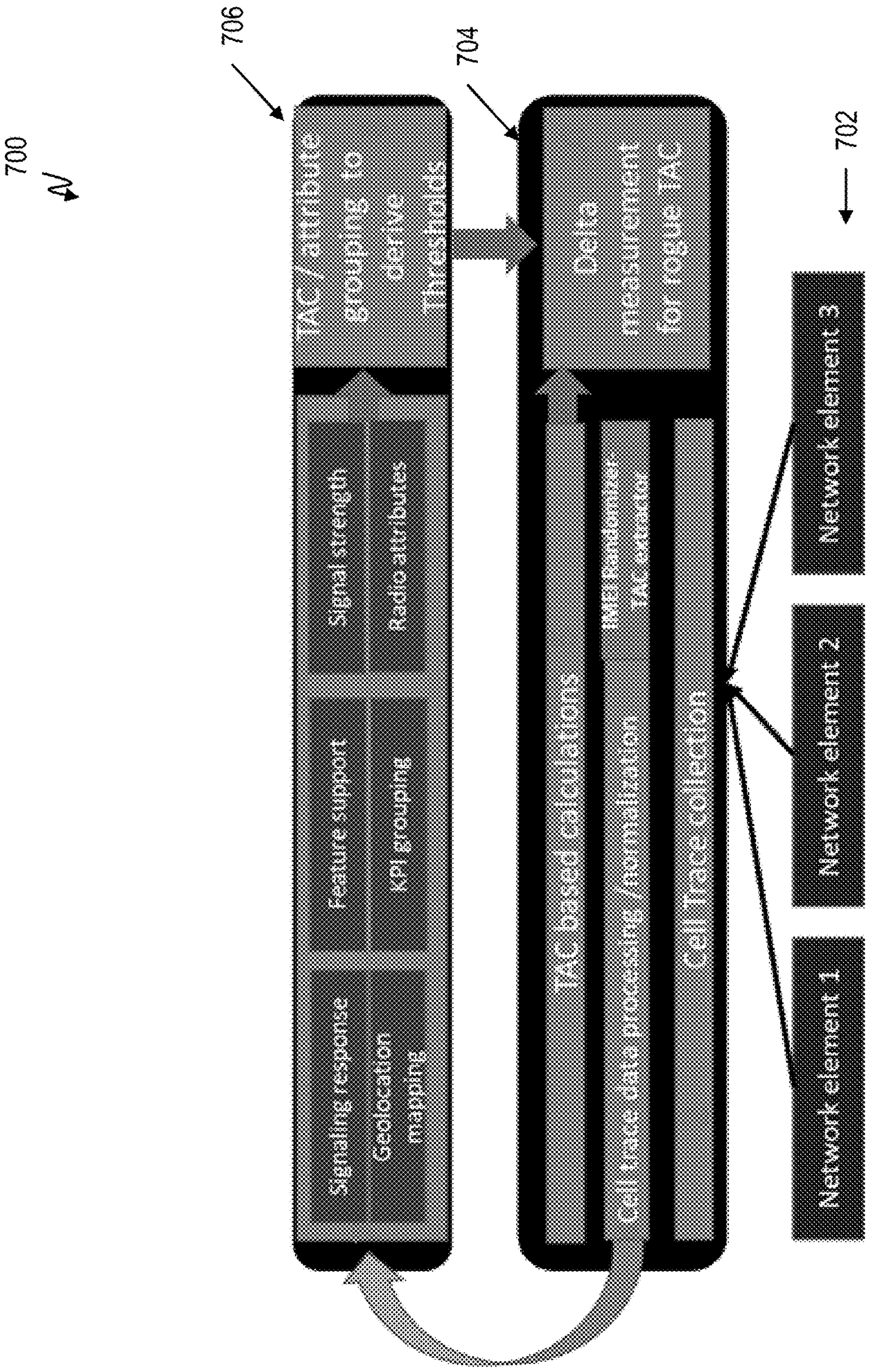
FIG. 7 is a block diagram of a system for autonomous identification of a rouge devices in a communications network in accordance with one or more embodiments of the present invention.

Referring now to FIG. 7 a block diagram of a system 700 for autonomous identification of a rouge devices in a communications network in accordance with one or more embodiments of the present invention is shown. As illustrated, the system 700 includes a plurality of network elements 702 that are configured to provide access to a communications network to mobile devices. Network elements may include radio base stations of 4G/5G/6G etc. Network elements may not only be limited to RAN specific data but can also include the interface related data like base station to base station interface, base station to Core nodes interfaces etc. Each of the plurality of network elements 702, are configured to communicate with an edge server 704, which may be embodied in a computing system such as the one shown in FIG. 1. The edge server 704 is configured to collect connection trace data for each of a plurality of mobile devices in communication with a communications network and to anonymizing the IMEI number of the collected data. As a result, the next blocks will receive only randomize IMEI's thus other entities will not be able to identify the subscriber's private identity. The system 700 also includes a cloud server 706 that receives data from a plurality of edge serves 704. The cloud server 706 may be embodied in a computing system such as the one shown in FIG. 1. The cloud server 706 is configured to perform statistical analysis on the collected connection trace data on a per TAC code basis to identify potential rouge groups of devices. The cloud server 706 is also configured and to calculate, and transmit to the edge server 704, a set of thresholds for each TAC code that the edge server 704 can use for real-time identification of rouge devices.

Statistical analysis includes bucketization of different attributes. One such attribute is a signaling response which is the patterns of response for the radio signaling from the base station so this block will capture the optimal response for certain signaling messages. For example, if base station sends the RRC reconfiguration request towards the UE then UE should send the RRC reconfiguration complete message as to adhere with the standards so this block has responsibility to capture the patterns & recognizing the patterns so pattern recognitions is important aspect of the process. Another such attribute is geolocation mapping which includes collecting the end user locations which can be on the basis of GPS location, triangulation method, or the like. A further attribute is feature support which includes capturing user equipment capability messages and capturing the feature group indicator message bits to benchmark the same chipset capabilities. For example, the same chipset should support similar advanced features like MIMO, FDD-TDD handover so it should be uniform. If some user equipment fails in some protocol testing (like Handover, a specific type of measurement etc.), it would be a good practice to check this information from UE and see if the feature to be tested is supported by the mobile devices.

The statistical analysis also includes KPI grouping, which includes collecting the different KPI attributes like throughput, latency, CSSR, and RRC signaling delay, and mapping all the relevant major KPI's from the cell traces. The signal strength is a measure of the individual devices signal strength, quality, interference etc. which is sent from the measurement report sent from the end devices towards the base station. In exemplary embodiments, the TAC codes are benchmarked against each other on basis of different attributes & thus reporting is done in case there is major discrepancy. For example, if a network operator implements new network feature, then by monitoring the signaling response block it will be able to identify which device models are adhering to desired response in real time.

Figure 8:
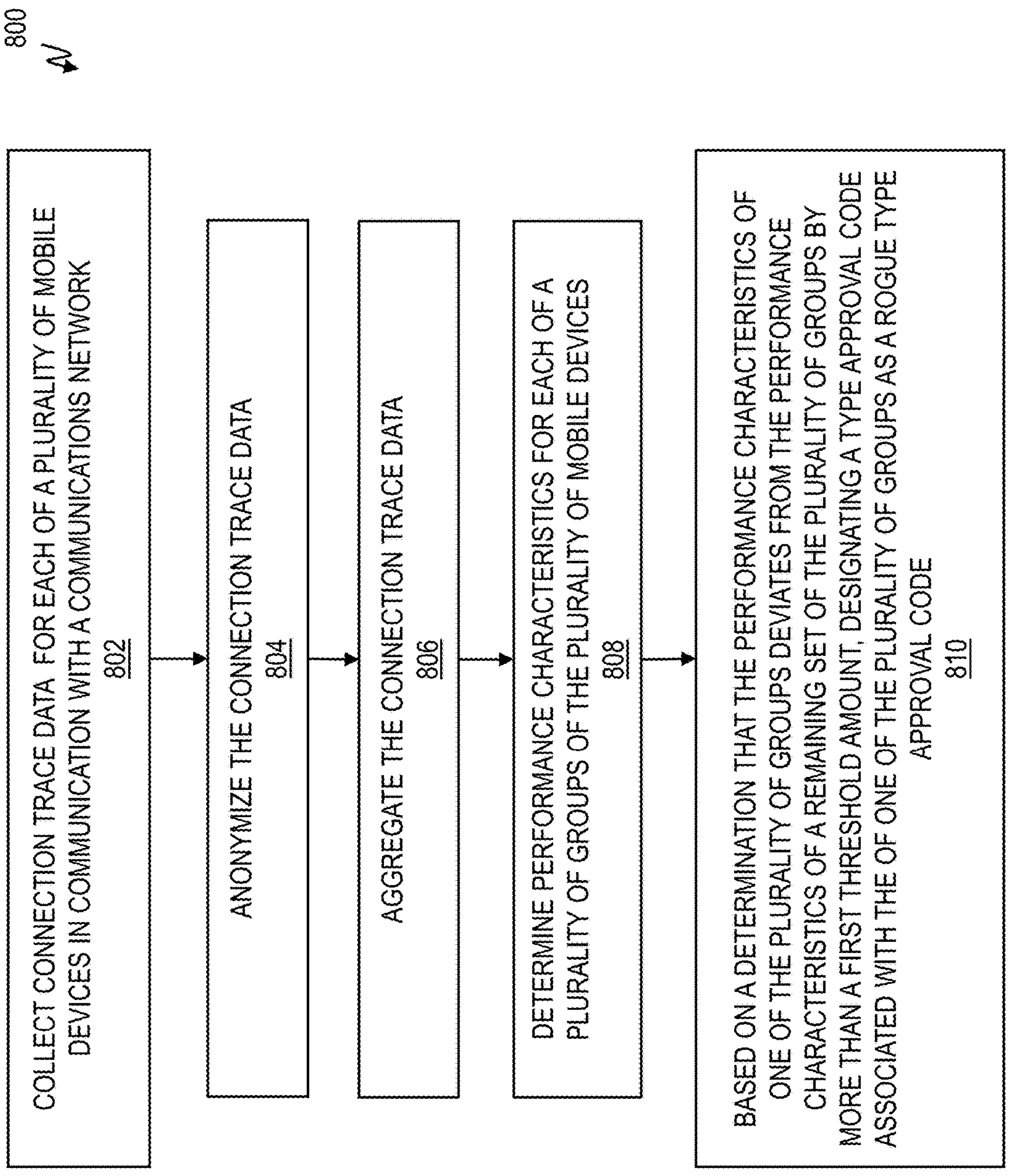
FIG. 8 is a flowchart of a method for autonomous identification of a rouge group of devices in a communications network in accordance with one or more embodiments of the present invention.

Referring now to FIG. 8 a flowchart of a method 800 for autonomous identification of a rouge group of devices in a communications network in accordance with one or more embodiments of the present invention is shown. As shown at block 802, the method 800 includes collecting connection trace data for each of a plurality of mobile devices in communication with a communications network. In exemplary embodiments, the connection trace data is connected by one or more pieces of network equipment in the communications network. Next, as shown at block 804, the method 800 includes anonymizing the IMEI number. In one embodiment, the IMEI number is anonymized by modifying the IMEI number for each piece of connection trace data.

The method 800 further includes aggregating the connection trace data, as shown at block 806. In exemplary embodiments, the connection trace data is aggregated by a trace analysis system on basis of TAC codes of the communications network. Next, as shown at block 808, the method 800 also includes determining performance characteristics such as cell coverage, channel quality, modulation scheme, signaling adherence (traffic storm), latency (millisecond), packet loss (ratio), bit error ratio, jitter (ms), availability, mobility (km/h), location accuracy, throughput, and the like for each of a plurality of groups of the plurality of mobile devices. In exemplary embodiments, each of the plurality of groups corresponds to mobile devices having the same type approval code (TAC), i.e., the same make and model of mobile device. In exemplary embodiments, determining performance characteristics for each of a plurality of groups of the plurality of mobile devices includes obtaining individual performance characteristics for each mobile device in the group and calculating an average of the individual performance characteristics.

The method 800 also includes designating a type approval code associated with the one of the plurality of groups as a rogue type approval code based on a determination that the performance characteristics of one of the plurality of groups deviate from the performance characteristics of a remaining set of the plurality of groups by more than a first threshold amount, as shown at block 810. In one embodiment, the first threshold amount is a fixed amount for each of the performance characteristics that is set by an operator of the communications network. In another embodiment, the first threshold amount is dynamically set by the trace analysis system based on the analysis of the collected trace data. For example, the first threshold amount for each performance characteristic may be set as a calculated standard deviation, or two standard deviations, from the average value of the performance characteristic.

In one embodiment, designating the type approval code associated with the one of the plurality of groups as the type approval code device causes the type approval code to be added to a blacklist of the communications network. In exemplary embodiments, the blacklist of the communications network includes one or more TAC code and/or IMEI numbers of mobile devices that are prohibited from using the communications network.

In one embodiment, designating the type approval code associated with the one of the plurality of groups as the rogue type approval code causes an anomaly report to be transmitted to a manufacturer associated with the type approval code. The anomaly report includes the performance characteristics for the one of the plurality of groups and an indication of which of the performance characteristics that caused the designation of a rouge device to be made. In addition, the anomaly report may include an indication of the average performance characteristics for the remaining set of the plurality of the groups of mobile devices.

Figure 9:
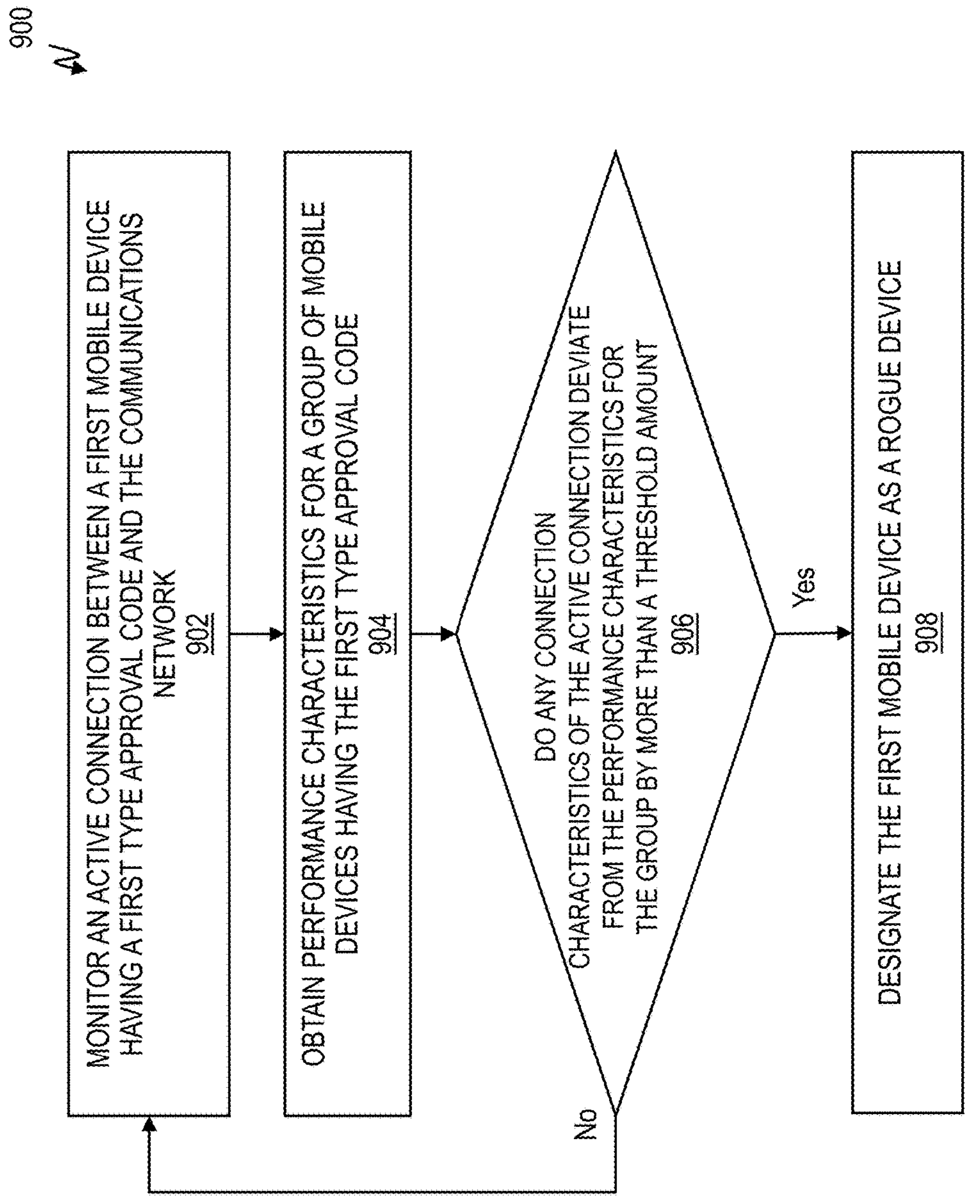
FIG. 9 is a flowchart of a method for autonomous identification of a rouge device in a communications network in accordance with one or more embodiments of the present invention.

Referring now to FIG. 9, a flowchart of a method 900 for autonomous identification of a rouge device in a communications network in accordance with one or more embodiments of the present invention is shown. As shown at block 902, the method 900 includes monitoring an active connection between a first mobile device having a first type approval code and the communications network. Next, as shown at block 904, the method 900 includes obtaining performance characteristics for a group of mobile devices having the first type approval code.

As shown at decision block 906, the method 900 includes determining whether any connection characteristics of the active connection deviate from the performance characteristics for the group by more than a threshold amount. In exemplary embodiments, a network operator sets the threshold amount for each of the performance characteristics. Based on a determination that one or more of the connection characteristics of the active connection deviate from the performance characteristics for the group by more than the threshold amount, the method 900 proceeds to block 908 and designates the first mobile device as a rogue device. In one embodiment, designating the first mobile device as a rogue device causes the IMEI number of the first mobile device to be added to a blacklist of the communications network.

Technical advantages and benefits include methods, systems, and computer program products that provide autonomous identification of rouge devices in a communications network. The autonomous identification of rouge devices in a communications network removes the need for manually testing device compatibility, reviewing the testing data, and adding the device to a whitelist of the mobile network by leveraging the communications network to collect and analyze the performance data of mobile devices on the communications network.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

collecting connection trace data including connection characteristics for each of a plurality of mobile devices in communication with a communications network;

aggregating the connection trace data;

determining performance characteristics for each of a plurality of groups of the plurality of mobile devices, wherein each of the plurality of groups corresponds to mobile devices having a type approval code;

comparing the performance characteristics for each of the plurality of groups; and based on a determination that the performance characteristics of one of the plurality of groups deviate from the performance characteristics of a remaining set of the plurality of groups by more than a first threshold amount, designating the type approval code associated with the one of the plurality of groups as a rogue type approval code, wherein designating the type approval code associated with the one of the plurality of groups as the rogue type approval code causes an anomaly report to be transmitted to a manufacturer associated with the type approval code, and wherein the anomaly report includes the performance characteristics for the one of the plurality of groups and an indication of which of the performance characteristics caused the designation of a rogue device to be made.

2. The method of claim 1, further comprising modifying a serial number of an international mobile equipment identity (IMEI) number of the connection trace data.

3. The method of claim 1, wherein designating the type approval code associated with the one of the plurality of groups as the type approval code device causes the type approval code to be added to a blacklist of the communications network.

4. The method of claim 1, wherein the anomaly report further includes an indication of average performance characteristics for the remaining set of the plurality of groups.

5. The method of claim 1, further comprising:

monitoring an active connection between a first mobile device having a first type approval code and the communications network;

obtaining the performance characteristics for a group of mobile devices having the first type approval code; and based on a determination that one or more connection characteristics of the active connection deviate from the performance characteristics for the group of mobile devices having the first type approval code by more than a second threshold amount, designating the first mobile device as a rogue device.

6. The method of claim 5, wherein designating the first mobile device as the rogue device causes an international mobile equipment identity (IMEI) number of the first mobile device to be added to a blacklist of the communications network.

7. A system comprising:

a memory having computer readable instructions; and one or more processors for executing the computer readable instructions, the computer readable instructions controlling the one or more processors to perform operations comprising:

collecting connection trace data including connection characteristics for each of a plurality of mobile devices in communication with a communications network;

aggregating the connection trace data;

determining performance characteristics for each of a plurality of groups of the plurality of mobile devices, wherein each of the plurality of groups corresponds to mobile devices having a type approval code;

comparing the performance characteristics for each of the plurality of groups; and based on a determination that the performance characteristics of one of the plurality of groups deviate from the performance characteristics of a remaining set of the plurality of groups by more than a first threshold amount, designating the type approval code associated with the one of the plurality of groups as a rogue type approval code, wherein designating the type approval code associated with the one of the plurality of groups as the rogue type approval code causes an anomaly report to be transmitted to a manufacturer associated with the type approval code, and wherein the anomaly report includes the performance characteristics for the one of the plurality of groups and an indication of which of the performance characteristics caused the designation of a rogue device to be made.

8. The system of claim 7, wherein the operations further comprise modifying a serial number of an international mobile equipment identity (IMEI) number of the connection trace data.

9. The system of claim 7, wherein designating the type approval code associated with the one of the plurality of groups as the type approval code device causes the type approval code to be added to a blacklist of the communications network.

10. The system of claim 9, wherein the anomaly report further includes an indication of average performance characteristics for the remaining set of the plurality of groups.

11. The system of claim 7, wherein the operations further comprise:

monitoring an active connection between a first mobile device having a first type approval code and the communications network;

obtaining the performance characteristics for a group of mobile devices having the first type approval code; and based on a determination that one or more connection characteristics of the active connection deviate from the performance characteristics for the group of mobile devices having the first type approval code by more than a second threshold amount, designating the first mobile device as a rogue device.

12. The system of claim 11, wherein designating the first mobile device as the rogue device causes an international mobile equipment identity (IMEI) number of the first mobile device to be added to a blacklist of the communications network.

13. A computer program product comprising a computer readable storage medium having program instructions embodied therewith, the program instructions executable by a processor to cause the processor to perform operations comprising:

collecting connection trace data including connection characteristics for each of a plurality of mobile devices in communication with a communications network;

aggregating the connection trace data;

determining performance characteristics for each of a plurality of groups of the plurality of mobile devices, wherein each of the plurality of groups corresponds to mobile devices having a type approval code;

comparing the performance characteristics for each of the plurality of groups; and based on a determination that the performance characteristics of one of the plurality of groups deviate from the performance characteristics of a remaining set of the plurality of groups by more than a first threshold amount, designating the type approval code associated with the one of the plurality of groups as a rogue type approval code, wherein designating the type approval code associated with the one of the plurality of groups as the rogue type approval code causes an anomaly report to be transmitted to a manufacturer associated with the type approval code, and wherein the anomaly report includes the performance characteristics for the one of the plurality of groups and an indication of which of the performance characteristics caused the designation of a rogue device to be made.

14. The computer program product of claim 13, wherein the operations further comprise modifying a serial number of an international mobile equipment identity (IMEI) number of the connection trace data.

15. The computer program product of claim 13, wherein designating the type approval code associated with the one of the plurality of groups as the type approval code device causes the type approval code to be added to a blacklist of the communications network.

16. The computer program product of claim 13, wherein the anomaly report further includes an indication of average performance characteristics for the remaining set of the plurality of groups.

17. The computer program product of claim 13, wherein the operations further comprise:

monitoring an active connection between a first mobile device having a first type approval code and the communications network;

obtaining the performance characteristics for a group of mobile devices having the first type approval code; and based on a determination that one or more connection characteristics of the active connection deviate from the performance characteristics for the group of mobile devices having the first type approval code by more than a second threshold amount, designating the first mobile device as a rogue device.

* * * * *